Figure 1:
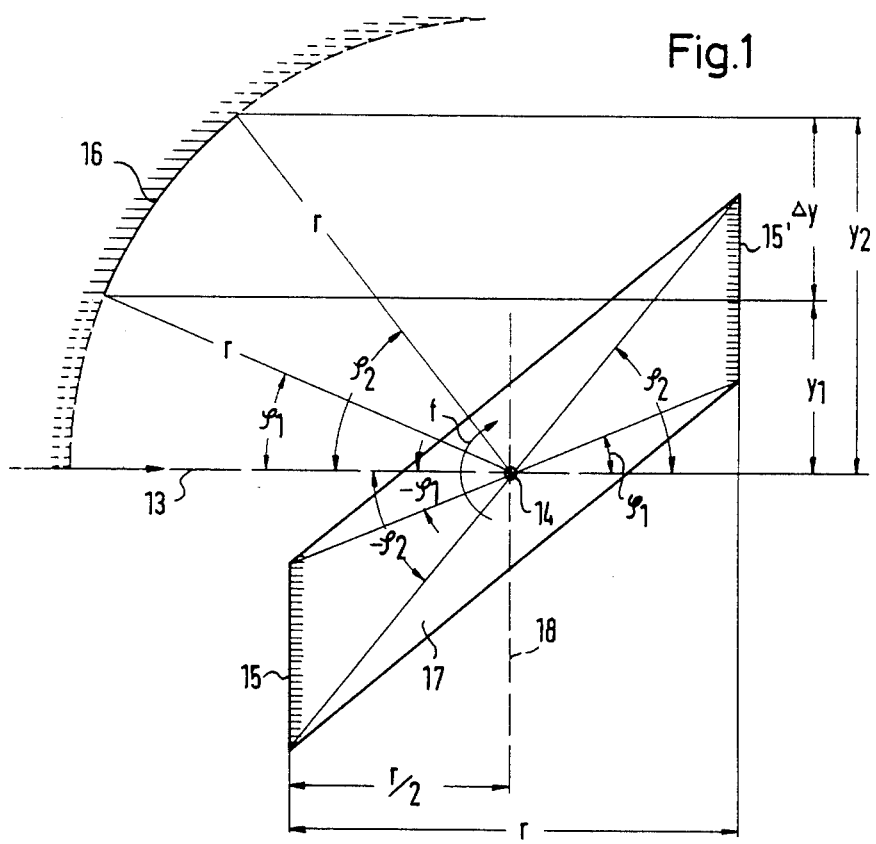

United States Patent
Walter

[11] 3,814,495
[45] June 4, 1974

[54] APPARATUS FOR PRODUCING A MOVING BEAM DISPLACED PARALLEL TO ITSELF

[75] Inventor: Arthur Walter, Denzlingen, Germany

[73] Assignee: Erwin Sick Optic-Electronik, Waldkirch, Germany

[22] Filed: Dec. 26, 1972

[21] Appl. No.: 318,620

[30] Foreign Application Priority Data
Dec. 24, 1971  Germany.......................... 2164607

[52] U.S. Cl.......................... 350/7, 350/6, 350/293, 350/299, 178/7.6
[51] Int. Cl. ........................................... G02b 17/00
[58] Field of Search .......... 350/6, 7, 285, 293, 294, 350/288, 285, 299; 178/7.6

[56] References Cited
UNITED STATES PATENTS

| | | | |
|---|---|---|---|
| 3,510,191 | 5/1970 | Cannon, Jr. | 350/7 |
| 3,511,551 | 5/1970 | Matulka | 350/7 |
| 3,544,165 | 12/1970 | Snedden | 350/6 |
| 3,637,281 | 1/1972 | Gull | 350/7 |

*Primary Examiner*—Ronald L. Wibert
*Assistant Examiner*—Michael J. Tokar

[57] ABSTRACT

A scanning device with rotatable plane mirror surfaces movable about the radius of curvature of a cylindrical mirror and positioned to pass through the focal plane of the cylindrical mirror. A light beam relayed from the movable plane mirror is reflected from the cylindrical mirror along a path parallel to the optical axis of the device for each successive position of the plane mirror.

13 Claims, 3 Drawing Figures

APPARATUS FOR PRODUCING A MOVING BEAM DISPLACED PARALLEL TO ITSELF

The invention relates to an apparatus for producing a moving beam, which is displaced parallel to itself, from a light beam entering on an axis, which apparatus has at least one plane mirror surface which rotates about an axis of rotation perpendicular to the axis of the light beam and is disposed parallel to the axis of rotation and which intermittently intersects the light beam axis during the rotation, the apparatus also having a curved mirror surface which reflects into paths parallel to one another the light beams reflected by the plane mirror surface. Devices of this kind are mainly used in the formation of light curtains which are intended to operate an alarm signal if an obstacle is introduced into them.

Numerous arrangements of this kind are already known which generally work with mirror wheels or swinging mirrors or else with parabolic cylinder mirrors. In order to obtain exactly parallel displacement of the moving beam, however, relatively great expense for optical equipment has to be incurred.

The aim of the invention consists in providing a device of the kind first mentioned above which supplies a moving beam displaced strictly parallel to itself without having to use optical devices which are complicated or require expensive machining.

In order to solve this problem the invention provides for the curved mirror surface to be a cylinder mirror the centre of curvature of which coincides with the axis of rotation and for the plane mirror surface to be at a distance equal to half the radius of curvature of the cylinder mirror from an imaginary surface extending through the axis of rotation and parallel to the plane mirror surface. According to the invention therefore only plane and cylindrical optical mirror surfaces, which are simple to produce with the required accuracy, are used. Nevertheless, because of the special arrangement of the surfaces which is selected according to the invention, absolute parallelism in the parallel displacement of the moving beam is obtained.

In a preferred embodiment two plane mirror surfaces which are disposed symmetrically to the imaginary surface, and which rotate together at the same speed about the axis of rotation, are provided. It is preferable for the two plane mirror surfaces to be formed on a body rotating about the axis of rotation. This embodiment corresponds to a mirror wheel having two parallel plane reflecting surfaces.

In another particularly preferred embodiment the construction is such that the plane mirror surfaces are disposed perpendicularly to the axis of the incoming light beam and their dimensions in the direction perpendicular to the axis of the incoming light beam are limited by two angles of different magnitudes about the axis of rotation in relation to the axis of the light beam. The larger of the two angles is preferably smaller than or equal to 60°. In this arrangement optimum utilisation of the reflecting surfaces is achieved through the fact that the dimensions of the cylinder mirror in the peripheral direction are limited by angles of 180° less precisely the same two angles. The dimensions of the cylinder mirror in the peripheral direction are however preferably extended slightly further towards both sides.

In order to obtain the greatest possible range of deflection of the moving beam, according to the invention, the two angles are linked by the following relationship:

$$\tan \phi_2 = 3 \times \tan \phi_1.$$

The rotating body carrying the plane mirror surfaces preferably has a parallelogram cross-section perpendicularly to the axis of rotation, while it is convenient for the plane mirror surfaces to be formed on the shorter sides of the parallelogram.

Through the proposals made according to the invention for the dimensions and arrangement of the plane mirror surfaces and of the cylinder mirror surface, an optimum scanning range is obtained while strictly complying with the condition of parallelism. Because the conditions according to the invention make it necessary for the rotating mirror to be disposed near the cylinder mirror, the rules for dimensions proposed by the invention are particularly important in obtaining an acceptable scanning range.

In a preferred embodiment of the invention the moving beam is passed through a beam splitter mirror and a measuring field to a reflector, and from the latter is reflected back on itself through the beam splitter and into a first photoelectric cell. It is convenient for the moving beam also to be passed via the beam splitter mirror to a grid the grid lines of which extend perpendicularly to the direction of movement of the incident moving beam, the light passing through the grid being collected in the second photoelectric cell whose output signal is used as timing scale. Because of the exact parallelism of the moving beam, which is periodically moved to-and-fro, as the result of the arrangement according to the invention, extremely accurate determination of the location of an obstacle in the measuring field can be achieved in this way.

Although it is preferred to use a rotating mirror in the apparatus according to the invention, the principle of the invention can also be embodied when using a swinging mirror adapted to move to-and-fro about the axis of rotation, provided that the dimension requirements defined above are fulfilled.

Figure 2:
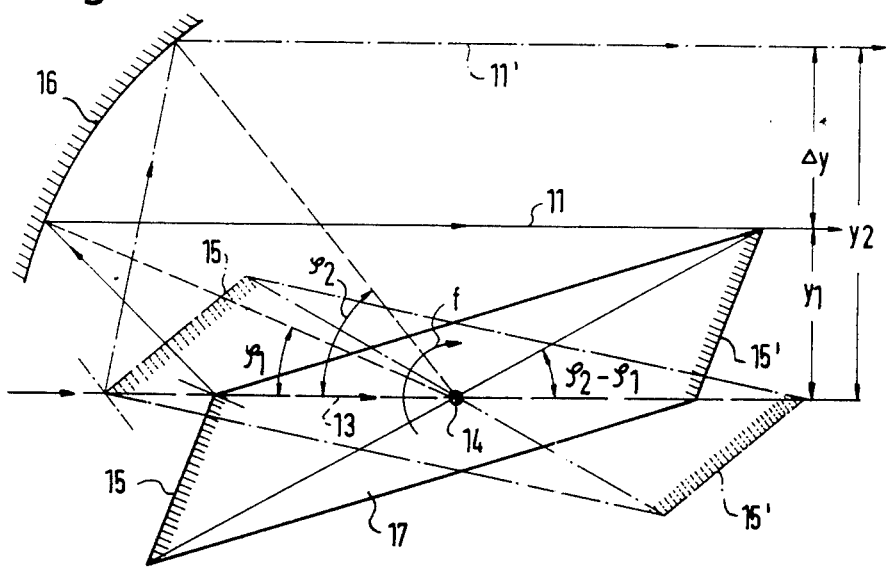
Figure 3:
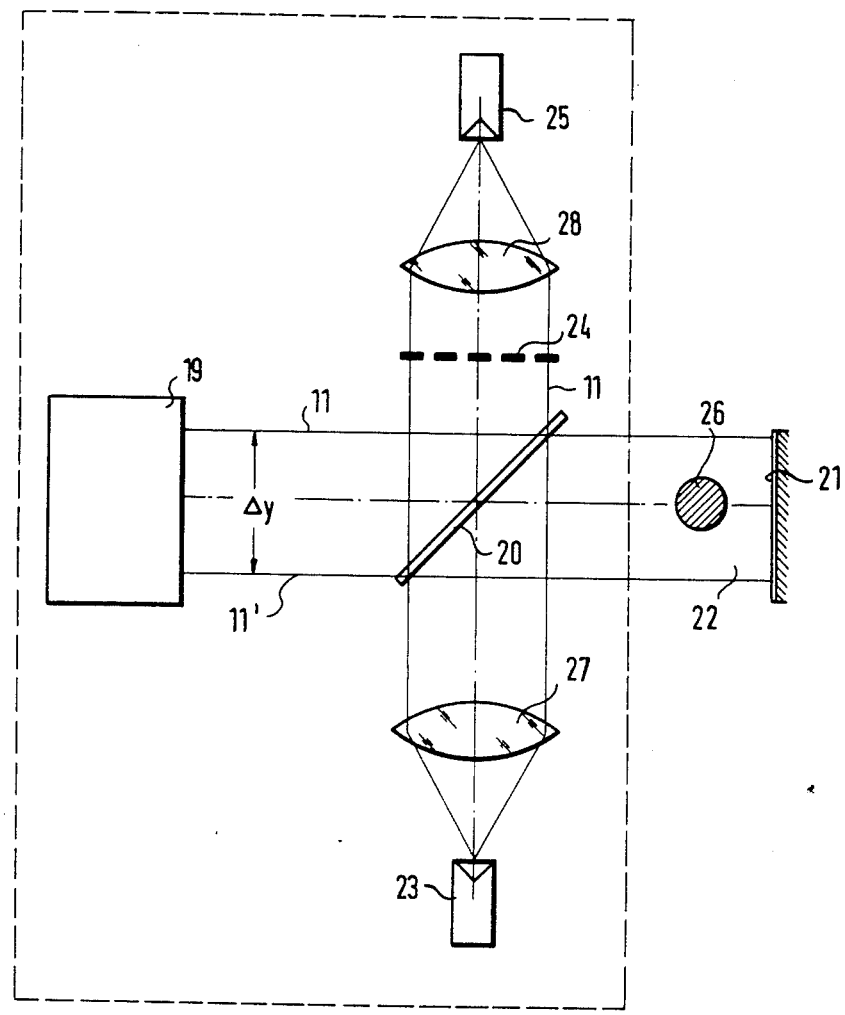

The invention is described below by way of example with reference to the drawings in which:

FIG. 1 is a diagrammatical view of a preferred apparatus according to the invention, FIG. 2 is a view corresponding to FIG. 1 and illustrating the production of the moving beam displaced parallel to itself, and FIG. 3 shows diagrammatically the optical path of an apparatus for digital length measurement according to the invention.

According to FIG. 1, an incoming light beam enters the apparatus according to the invention along the axis 13. On the axis 13 of the light beam is situated the axis of rotation 14 of a body 17 the cross-section of which has the shape of a parallelogram at right angles to the axis of rotation, which in turn is perpendicular to the plane of the drawing. Plane mirror surfaces 15, 15' are situated on the shorter sides of the parallelogram body 17.

For the definition of the position of the plane mirror surfaces 15, 15' it is important that the body 17 should provisionally be imagined to be fastened in the position shown in FIG. 1. In this position the plane mirror surfaces 15, 15' are perpendicular to the light beam axis 13.

The two mirror surfaces 15, 15' are situated at a distance $r/2$ from an imaginary surface 18 which is parallel to them and extends through the axis of rotation 14, that is to say the total distance between them amounts to $r$.

Vectors extending from the axis of rotation 14 to the four corners of the parallelogram enclose with the light beam axis 13, angles $\phi_1$, $\phi_2$, $-\phi_1$, and $-\phi_2$. The position of the mirror surfaces 15, 15' is unmistakably defined by these data.

The second important element of the object of the invention is a cylinder mirror surface 16, the radius of curvature of which is equal to the distance between the plane mirror surfaces 15, 15', that is to say is equal to $r$.

The spatial position and dimensions of the cylinder mirror 16 are determined firstly by the fact that the axis of the cylinder coincides with the axis of rotation 14. Secondly, the peripheral length of the cylinder mirror 16 is determined by the same two angles $\phi_1$ and $\phi_2$ in relation to the axis of the light beam 13 as apply to the arrangement of the plane mirror surfaces 15, 15'. If the arrangement shown in FIG. 1 is regarded as a coordinate system with the axis of rotation 14 as its origin and with the light beam axis 13 as its X-axis, the peripheral dimension of the cylinder mirror 16 is determined by the angles $180 - \phi_1$ and $180 - \phi_2$ (designated $\phi_1$ and $\phi_2$), if the angles of the plane mirror surface 15' are designated $\phi_1$ and $\phi_2$. The angles defining the plane mirror surface 15 are then $180 + \phi_1$ and $180 + \phi_2$ (designated $-\phi_1$ and $-\phi_2$).

In FIG. 2 are shown the two limit positions of the rotating body 17 which supply the two moving beams 11, 11' furthest distant from one another. The vectors of these limit moving beams 11, 11', extending from the axis of rotation 14 to the reflection points on the cylinder mirror 16, enclose the angles $\phi_1$ and $\phi_2$ with the light beam axis 13. The direction of rotation of the body 17 is indicated by the arrow $f$.

In order to obtain an optimum scanning range, according to the invention the requirement $$\phi_2 \geq 60°$$

has to be fulfilled.

Another optimisation condition for the angles $\phi_1$ and $\phi_2$ is according to the invention:

$$\tan \phi_2 = 3 \times \tan \phi_1.$$

The following conditions:

$$y1 = r \times \sin \phi_1$$
$$y2 = r \times \sin \phi_2$$

apply to the heights $y1$ and $y2$ of the moving beams 11, 11' above the light beam axis 13.

Accordingly, the range which can be utilized for scanning with a moving beam displaced parallel to itself is as follows:

$$\Delta y = r \times (\sin \phi_2 - \sin \phi_1).$$

A practical numerical example is given below. Let it be assumed that $\phi_1 = 22°$ and $\phi_2$ 50°30'. We than have $$y2 = 0.772 \times r$$
$$y1 = 0.375 \times r.$$

From this follows $$\Delta y = 0.397 \, r.$$

$\Delta y$ is however advantageously made slightly smaller, for example equal to $0.357 \times r$, in order to have a small reserve in the upward and downward direction. The following effective maximum and minimum values are thus obtained for $y$:

$$y2 = 0.752 \times r$$
$$y1 = 0.395 \times r.$$

The following condition is thus obtained for the selection of $r$:

$$r = 2.8 \times \Delta y,$$

so that for the desired scanning range $\Delta y$ the quantity $r$ can be immediately determined.

The moving beam 11 displaced strictly parallel to itself which can be achieved with the apparatus according to the invention can be used very advantageously for measuring purposes. Because of the great accuracy of measurement which can be achieved with its aid, digital evaluation is possible, with the additional advantage of being independent of the equation $$y = r \times \sin \phi.$$

A preferred application for measuring purposes is shown in FIG. 3. The deflecting unit 19 contains the deflecting device according to the invention, from which therefore the moving beam 11 (11'), which is continuously displaced parallel to itself within the region $\Delta y$ passes out. The moving beam first passes through a beam splitter mirror, which is preferably disposed at an angle of 45°, onto a reflector 21 which reflects the moving beam back into itself. The moving beam is then reflected on the splitter mirror 20 and passed through a suitable optical system 27 into a first photoelectric cell 23. The region in front of the reflector 21, extending to the light outlet of the apparatus (broken line) constitutes the measuring field 22, in which for example an obstacle 26 can be disposed.

In addition, the moving beam 11 is passed through the splitter mirror 20 to a grid 24. The light passing through the grid is passed through an optical system 28 to a second photoelectric cell 25. The output signal of the photoelectric cell 5 supplies a timing scale which is essential for the exact determination of the location of the obstacle 26. The arrangement shown in FIG. 3 can advantageously also be used when other deflection systems are employed. The output signals of the two photoelectric cells 23, 25 are according to the invention logically combined in such a manner that the desired length within the measurement field is represented.

With the values of 22° for $\phi_1$ and 50°30' for $\phi_2$ which are assumed hereinabove and with an assumed speed of rotation of the mirror of 3,000 r.p.m., the transit time of the moving beam 11 through the useful region $\Delta y$ is obtained as follows:

$$t_d = 60/3,000 \times 50.5° - 22°/360° = 1.52 \text{ ms.}$$

Since two plane mirror surfaces are provided on the mirror wheel body 17, the scanning frequency is obtained as follows:

$$f = 3,000/60 \times 2 = 100 \text{ c/s.}$$

A scanning period has the following value:

$T = 1/f = 10$ ms.

In this example therefore the time during which a scanning moving beam is available amounts to about 30 percent of the total cycle time.

A preferred method for producing a precision light curtain with digital measurement proceeds as follows:

The width $\Delta y$ of the scanning field 22, the depth of the measuring field, and the resolution A are prescribed. The radius $r$ and the angles $\phi_1$ and $\phi_2$ and the grid scale are now to be determined.

One of the angles $\phi_1$ or $\phi_2$ is now prescribed and the other angle calculated from the formula given above. Since the measuring height $\Delta y$ is prescribed, the radius $r$ can now be determined from the formulae given above. The possibility of slightly reducing the effective limits of the scaling range should also be considered. Because of the glare of the light beam it is convenient to use only 90 percent of the maximum utilisable range.

The grid field width B is obtained from the following relationship:

$$B = 2\ A \times \Delta y.$$

Taking into account the values of 22° and 50°30' respectively which were assumed above for $\phi_1$ and $\phi_2$, the following values are assumed for the other magnitudes:

$$\Delta y = 20.$$

length of measuring field = 60, $$A = 1/1,000.$$

$$\Delta y/r = 0.397.$$

Bearing in mind that only 90 percent of the maximum possible scanning range should be used, the value of $r$ is obtained as follows:

$$r = 20/0.9 \times 0.397 = 56.5 \text{ mm}$$

Rounded off, a value of 56 mm is selected for $r$.

The grid field width B is determined as follows:

$$B = 2 \times 20/1,000 = 0.04 \text{ mm}.$$

The theoretical accuracy of measurement is:

$$\pm H \times A = \pm 0.02 \text{ mm}.$$

The materials used for the cylinder and the rotating mirror should preferably have low thermal expansion. Quartz glass and Zerodur and also Jena glass "2000" are particularly suitable.

I claim:

1. An apparatus for producing a moving beam, displaced parallel to itself, from a light beam entering on an axis, which apparatus has at least one plane mirror surface which rotates about an axis of rotation perpendicular to the axis of the light beam and is disposed parallel to the side axis of rotation and which intermittently intersects the axis of the light beam during the rotation, and which apparatus further has a curved mirror surface which reflects in paths parallel to one another the light beams reflected from the plane mirror surface, said curved mirror surface being a cylinder mirror whose centre of curvature coincides with the axis of rotation, said plane mirror surface being at a distance ($r/2$) equal to half the radius of curvature ($r$) of the cylinder mirror from an imaginary surface which is parallel to the said plane mirror surface and extends through the axis of rotation.

2. An apparatus according to claim 1, comprising two parallel mirror surfaces which are symmetrical to the imaginary surface, and which together rotate at the same speed about the axis of rotation.

3. An apparatus according to claim 2, wherein said two plane mirror surfaces are formed on a body rotating about the axis of rotation.

4. An apparatus according to claim 1, wherein, when the plane mirror surfaces are perpendicular to the incoming light beam axis the dimensions of the mirror surfaces in the direction perpendicular to the incoming light beam axis are limited by two angles ($\phi_1$, $\phi_2$; $-\phi_1$, $-\phi_2$) of different magnitudes about the axis of rotation in relation to the light beam axis.

5. An apparatus according to claim 4, wherein the larger of the two angles is smaller than 60°.

6. An apparatus according to claim 4, wherein the dimensions of the cylinder mirror in the peripheral direction are limited by an angle of 180° less the same two angles (180°−$\phi_1$, 180°−$\phi_2$).

7. An apparatus according to claim 6, wherein the dimensions of the cylinder mirror in the peripheral direction are slightly extended towards both sides.

8. An apparatus according to one of claim 4, wherein said the two angles ($\phi_1$, $\phi_2$) are linked by the following relationship:

$$\tan \phi_2 = 3 \times \tan \phi_1.$$

9. An apparatus according to claim 3, wherein the rotating body carrying the plane mirror surfaces has a parallelogram-shaped cross-section perpendicularly to the axis of rotation.

10. An apparatus according to claim 4, wherein the larger of said two angles equals 60°.

11. An apparatus according to claim 5, wherein the dimensions of the cylinder mirror in the peripheral direction are limited by an angle of 180° less the same two angles (180° − $\phi_1$, 180° − $\phi_2$).

12. An apparatus according to claim 11, wherein dimensions of the cylinder mirror in the peripheral direction are slightly extended towards on both sides.

13. An apparatus according to claim 2, wherein, when the plane mirror surfaces are perpendicular to the incoming light beam axis, the dimensions of the mirror surfaces in the direction perpendicular to the incoming light beam axis are limited by two angles ($\phi_1$, $\phi_2$; $-\phi_1$, $-\phi_2$) of different magnitudes about the axis of rotation in relation to the light beam axis.

* * * * *

UNITED STATES PATENT OFFICE
CERTIFICATE OF CORRECTION

Patent No. 3,814,495      Dated June 4, 1974

Inventor(s) Arthur Walter

It is certified that error appears in the above-identified patent and that said Letters Patent are hereby corrected as shown below:

Column 5, line 58, change "the side" by --said--.
Column 6, line 34, delete "one of" and line 35, delete "the".

Signed and sealed this 5th day of November 1974.

(SEAL)
Attest:

McCOY M. GIBSON JR.
Attesting Officer

C. MARSHALL DANN
Commissioner of Patents